Patented Aug. 7, 1934

1,969,246

UNITED STATES PATENT OFFICE 1,969,246

PRIMING COMPOSITION

Alfred Weale, Heswall, England, assignor to Imperial Chemical Industries Limited, a corporation of Great Britain No Drawing. Application September 14, 1931, Serial No. 562,834. In Great Britain September 18, 1930

2 Claims. (Cl. 52—2)

This invention relates to improvements in priming compositions containing lead peroxide, and its principal object is to secure a uniform sensitiveness to percussion in such compositions irrespective of the quality of the lead peroxide employed in their manufacture.

Lead peroxide is already widely used as a component in many percussion cap compositions and it is well known that the sensitiveness of such compositions to percussion is subject to variation owing to differences in the samples of lead peroxide used. It is difficult to obtain lead peroxide of constant quality, and trouble is frequently experienced by percussion cap manufacturers owing to the fact that their caps fail to attain standard requirements of sensitiveness, as tested by percussion methods, in consequence of the variation in the samples of lead peroxide.

I have now found that priming compositions containing unsatisfactory samples of lead peroxide may be greatly improved in sensitiveness, as measured by the fall hammer or other suitable test, if there is included in the priming composition a small quantity of a substance which, under the conditions of use, acts as a catalyst for the lead peroxide and facilitates the breakdown or decomposition of the oxidizing material, in the cap composition.

Examples of such catalytic or sensitizing substances are manganese dioxide, vanadium pentoxide, molybdenum trioxide, and sodium tungstate. The amount of these included in the priming composition is preferably of the order of 1 to 5 per cent of the weight of the lead peroxide, but amounts as low as 0.05 per cent have been found to function. Mixtures of two or more catalysts may be employed.

The invention finds its best application in the case of mixes that are normally of a low sensitiveness. Thus mixtures of equal parts of lead mononitroresorcinate and three different samples of lead peroxide purchased from the same source gave the following results when tested under a 2 oz. fall hammer.

(1) fired at 9"
(2) fired at 8"
(3) fired at 4"

the result in each case representing the average of ten tests. But when 0.5 per cent of manganese dioxide was added to (1) the caps fired at 5", an increase in the sensitiveness of 4".

It is essential that the mixing should be thorough, especially when working with very low contents of admixed catalytic substances. The preferred method is to mix a large quantity of the catalytic substance into the lead peroxide and then to take a known weight of this mixture and add it to a definite weight of untreated lead peroxide this process being continued until the required percentage content of catalyst is obtained.

As many apparent and widely different embodiments of this invention may be made without departing from the spirit thereof, it is to be understood that I do not limit myself to the foregoing examples or descriptions except as indicated in the following patent claims.

I claim:

1. The process of making priming compositions containing lead peroxide which comprises incorporating into the composition a small proportion of a catalyst or sensitizer for the lead peroxide taken from a group consisting of manganese dioxide, vanadium pentoxide, molybdenum trioxide, and sodium tungstate, and mixtures of at least two of these.

2. A priming composition containing lead peroxide and having incorporated in the composition a small proportion of a catalyst or sensitizer for the lead peroxide taken from a group consisting of manganese dioxide, vanadium pentoxide, molybdenum trioxide, sodium tungstate, and mixtures of at least two of these.

ALFRED WEALE.